(12) United States Patent
Rowe et al.

(10) Patent No.: US 7,257,239 B2
(45) Date of Patent: Aug. 14, 2007

(54) METHOD AND APPARATUS FOR GENERATING MODELS OF INDIVIDUALS

(75) Inventors: Simon Michael Rowe, Bracknell (GB); Alistair William McLean, Bracknell (GB)

(73) Assignee: Canon Kabushiki Kaisha, Tokyo (JP)

( * ) Notice: Subject to any disclaimer, the term of this patent is extended or adjusted under 35 U.S.C. 154(b) by 734 days.

(21) Appl. No.: 10/241,594

(22) Filed: Sep. 12, 2002

(65) Prior Publication Data

US 2003/0063778 A1 Apr. 3, 2003

(30) Foreign Application Priority Data

Sep. 28, 2001 (GB) ................... 0123386.5

(51) Int. Cl.
*G06K 9/00* (2006.01)
(52) U.S. Cl. ...................................... 382/118; 382/103
(58) Field of Classification Search ................ 382/118, 382/103
See application file for complete search history.

(56) References Cited

U.S. PATENT DOCUMENTS

| 5,164,992 | A | * | 11/1992 | Turk et al. .................. 382/118 |
|---|---|---|---|---|
| 5,432,864 | A | * | 7/1995 | Lu et al. ..................... 382/118 |
| 5,442,716 | A | * | 8/1995 | Otsu et al. .................. 382/181 |
| 5,771,307 | A | * | 6/1998 | Lu et al. ..................... 382/116 |
| 6,044,168 | A | * | 3/2000 | Tuceryan et al. ........... 382/118 |
| 6,188,776 | B1 | | 2/2001 | Covell et al. |
| 6,222,939 | B1 | * | 4/2001 | Wiskott et al. ............. 382/209 |
| 6,345,109 | B1 | * | 2/2002 | Souma et al. ............... 382/118 |
| 6,556,196 | B1 | * | 4/2003 | Blanz et al. ................ 345/419 |
| 2002/0034319 | A1 | * | 3/2002 | Tumey et al. ............... 382/116 |
| 2002/0171648 | A1 | | 11/2002 | Inoue, et al. |
| 2003/0007669 | A1 | * | 1/2003 | Martinez .................... 382/118 |
| 2003/0012408 | A1 | * | 1/2003 | Bouguet et al. ............ 382/103 |
| 2004/0234109 | A1 | * | 11/2004 | Lemelson et al. .......... 382/118 |

FOREIGN PATENT DOCUMENTS

EP 0 664 526 A3 7/1995

(Continued)

OTHER PUBLICATIONS

Pentland, A., Moghaddam, B., and Starner, T. "View-Based and Modular Eigenspaces for Face Recognition.", Proceedings of IEEE conference on computer vision and pattern recognition, 1994, pp. 84-91.*

(Continued)

*Primary Examiner*—Matthew C. Bella
*Assistant Examiner*—Utpal Shah
(74) *Attorney, Agent, or Firm*—Fitzpatrick, Cella, Harper & Scinto

(57) ABSTRACT

A modelling system is provided in which a model generation computer (3) stores within a model database (17) a plurality of principle component analysis models (18-1-18*n*) for modelling individuals. The principle component analysis models (18-1-18-*n*) are generated from data sets of individuals sharing identifying characteristics e.g. the same gender/ethnicity/age etc. When a new image is to be modelled using the system, characterising data for the new individual is received together with an image of that individual. The characterising data is used to select from the model database (17) a principle component analysis model (18-1-18-*n*) where the principle component analysis model selected comprises a model generated utilising images of individuals sharing the identifying characteristics corresponding to the characterisation data for the individual to be modelled.

21 Claims, 9 Drawing Sheets

FOREIGN PATENT DOCUMENTS

| | | |
|---|---|---|
| EP | 0 991 023 A3 | 4/2000 |
| EP | 1039417 | 9/2000 |
| EP | 1 260 940 A2 | 11/2002 |
| EP | 1 330 124 A2 | 7/2003 |
| JP | 2001-229400 | 8/2001 |
| JP | 2001-312743 | 11/2001 |
| WO | WO 02/030171 A3 | 4/2002 |

OTHER PUBLICATIONS

Wiskott, L., Fellous, J., Kruger, N. and Malsburg, C., "Face Recognition and Gender Determination" Proc. of Int. Workshop on Automatic Face and Gesture-Recognition, 1995, pp. 92-97.*

"Active Appearance Models," T.F. Cootes, et al., Proc. European Conference on Computer Vision 1998, vol. 2, pp. 484-498, 1998.

"A Morphable Model for the Synthesis of 3D Faces," Blanz, et al., SIGGRAPH 99, Los Angeles, CA, Aug. 8-13, 1999.

Xu, G., et al., "Synthesis of Facial Caricatures Based on Exaggeration of Features in Shapes and Arrangement of Facial Parts," Course in Electronic Engineering, The Univ. of Electro-Communications, Tokyo, Japan, pp. 19-24., 1999.

Nagata, A., et al., Analysis of Face Impression Using Average Faces, Faculty of Technology, Tokyo engineering University, vol. J80-A, No. 8, 1997, pp. 1266-1272.

"Phantom Faces for Face Analysis," Laurenz Wiskott, Proc. of the 3rd Joint Symposium on Neural Computation, Pasadena, CA, Jun. 1996, vol. 6, pp. 46-52.

* cited by examiner

METHOD AND APPARATUS FOR GENERATING MODELS OF INDIVIDUALS

FIELD OF THE INVENTION

The present application relates to methods and apparatus for generating models of individuals. In particular, embodiments of the present application relates to methods and apparatus for modelling individuals using principle component analysis.

BACKGROUND OF THE INVENTION

There are many applications for computer systems that are able to generate recognisable images of individuals. These applications range from systems for displaying the face of a caller on a telephone through to computer graphics generated within computer games. Although model-based methods for representing faces exist, existing methods typically require a relatively large number of parameters in order to deal with the variation that exists in human faces.

One known method of modelling human faces is using principle component analysis. In order to generate a model of the way in which faces vary, a large data set of different faces is first obtained. Feature points on the faces are then identified so that an average face can be determined. The manner in which each individual face used to generate the model varies from this average face can then be identified and the results subjected to principle component analysis to determine the most significant ways in which faces within the data set vary.

By generating a model of an individual face using a limited number of the most significant variations, a reasonable approximation of a specific individual face can be generated.

Although a computer model derived from principle component analysis of a large number of faces can be used to form a relatively compact representation of a particular person, it is desirable to provide a system in which a high quality model of an individual face can be represented in as few parameters as possible. Further it is desirable that a model of an individual face can be generated quickly and easily.

SUMMARY OF THE INVENTION

In accordance with one aspect of the present invention there is provided a method of generating a model of an individual face comprising the steps of:
  obtaining a data set comprising face data representative of a plurality of different faces;
  for each item of face data in said data set associating each item of face data with type data, said type data identifying one or more characteristics of the individual represented by an item of face data;
  generating a plurality of principle component analysis models, wherein each of said principle component analysis models is associated with different type data and principle component analysis models associated with particular type data are generated utilising face data in said data set associated with said particular type data;
  associating face data for an individual with type data for said individual; and
  generating a model representation of the face of said individual by modelling said face of said individual utilising the principle component analysis model associated with the type data associated with said individual.

BRIEF DESCRIPTION OF THE DRAWINGS

Further aspects of the present invention will become apparent with reference to the accompanying drawings in which.

DETAILED DESCRIPTION OF THE PREFERRED EMBODIMENTS

First Embodiment

Figure 1:
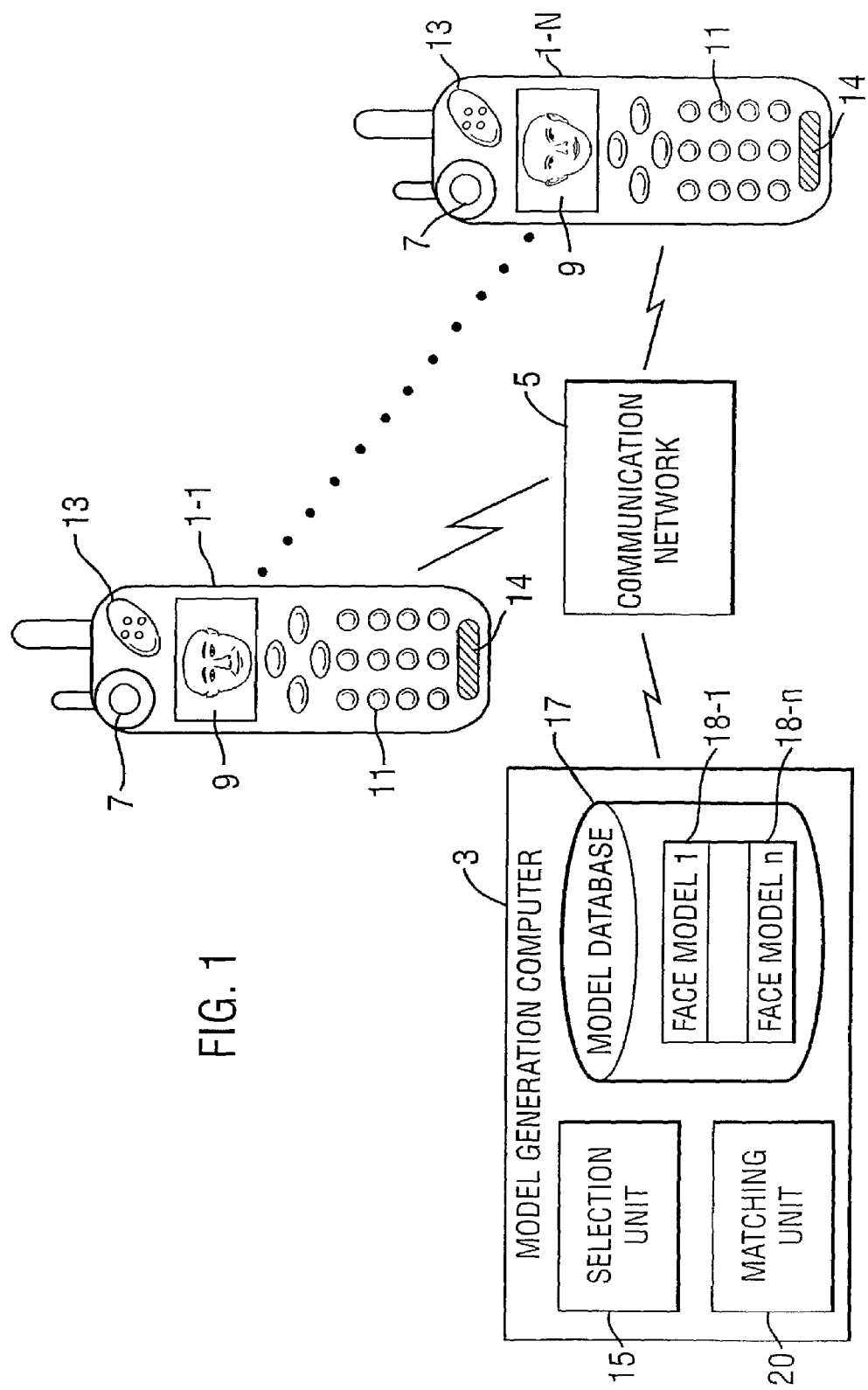
FIG. 1 is a schematic block diagram of communications network including a model generation computer in accordance with a first embodiment of the present invention.

FIG. 1 is a schematic block diagram of a communications system incorporating a face modelling system in accordance with the present invention. The communications system comprises a plurality of mobile telephones 1-1-1-N that are connected to each other and to a model generation computer 3 via a communications network 5. Each of the mobile phones 1-1; 1-N is adapted to enable an image of a caller to be displayed and comprises a camera 7 for taking pictures of the user of the phone 1-1; 1-N; a screen 9 for displaying an image of the face of an individual calling the mobile phone 1-1; 1-N, a keyboard 11, a loudspeaker 13 and a microphone 14.

The model generation computer 3 in accordance with this embodiment of the present invention is arranged to convert image data of faces received from the mobile phones 1-1; 1-N into highly compact models of representation of the received faces. This is achieved by the model generation computer 3 including a selection unit 15 and a model database 17 storing a number of different face models 18-1-18-$n$, where the stored models have been generated using image data of faces grouped by gender and ethnicity.

Specifically, in use, when an individual acquires one of the mobile telephones 1-1; 1-N, the individual first takes a picture of themselves using the camera 7 of the mobile phone 1-1; 1-N. The individual then sends a copy of the obtained image to the model generation computer 3 via the communications network 5 together with type data entered using the keyboard 11 which identifies the individual's gender and ethnicity.

When this data is received by the model generation computer 3 the selection unit 15 processes the received type data and selects from within the model database 17, a principle component analysis face model generated using images of faces of individuals sharing the gender and ethnicity combination identified by the type data.

Once the selection unit 15 has selected from the model database 17 a face model 18-1; corresponding to the received type data, a matching unit 20 provided within the model generation computer 3 processes the received image data of an individual using the selected face model to obtain a set of weighting values for modelling the received image. The set of weighting values are then returned to the individual's mobile phone 1-1; 1-N together with data identifying the face model 18-1; 18-n used to generate the weighting values.

Subsequently, when the individual uses their mobile phone 1-1; 1-N to make a telephone call 18-1-18-n, these weighting values and data identifying the face model used to obtain the weighting values are transmitted to a receiver's telephone 1-1; 1-N where the weighting values and data identifying the face model are processed so that an image of the caller can be displayed on the screen 9 of the recipient's telephone.

The model generation computer 3 of the present embodiment provides a modelling system that is efficient and enables an image of an individual face to be represented using a limited number of parameters. The inventors have appreciated that much of the apparent variability in human faces can be accounted for often by identifying the basic characteristics of an individual such as age, sex and ethnicity etc.

Furthermore, the inventors have appreciated that certain variations in human faces only exist within sub-groups identified by age, sex and ethnicity etc. Thus, for example, although beard growth causes significant facial differences to arise between men who have facial hair and men who do not, this variation is not of great importance when modelling the faces of women. Similarly, although apparent skin tone in an image of a face can vary significantly in an image due to variations in lighting, variation in skin tone is much more limited between individuals sharing the same ethnicity.

This appreciation gave rise to the realisation that by providing a modelling system in which faces sharing the same characteristics were processed separately would give rise to advantages in two areas.

Firstly, the total number of parameters necessary to model a reasonable approximation of an individual face is reduced. This is because as the individual face is modelled using data for a specific type, parameters for modelling non-existent variations in within individuals of that type are ignored. This reduction in the total number of parameters necessary for making a reasonable approximation of an individual face reduces the bandwidth requirements for transmitting models of images via the communications networks.

The modelling of faces using different models for different face types also gives rise to advantages when processing an individual received face. This is for two reasons. Firstly, as a received image is processed against model data for a specific gender and ethnicity combination, no modelling of variations in faces which do not arise within that model will be necessary and hence processing is reduced. Secondly, as in general faces sharing the same gender and ethnicity and hence the same type data are similar, when processing an image to determine a set of weighting values, the initial starting point for modelling an image is likely to be closer to a starting point for a more general model and hence less processing will be required.

Additionally, the quality of modelling achieved with a limited number of parameters is improved by processing images for different types separately. The improvement in image quality arises because the initial first approximation of a face based upon the selected type conveys a significant amount of information as to how a particular face is to be modelled as well as information about which types of facial variation are likely to be possible or not present.

Prior to describing the processing of the model generation computer 3 of FIG. 1 in detail, an exemplary data structure for face models 18-1-18-n in the model database 17 of the model generation computer 3 and a method for generating face models 18-1-18-n associated with different gender/ethnicity combinations will first be described in detail with reference to FIGS. 2 and 3.

Figure 2:
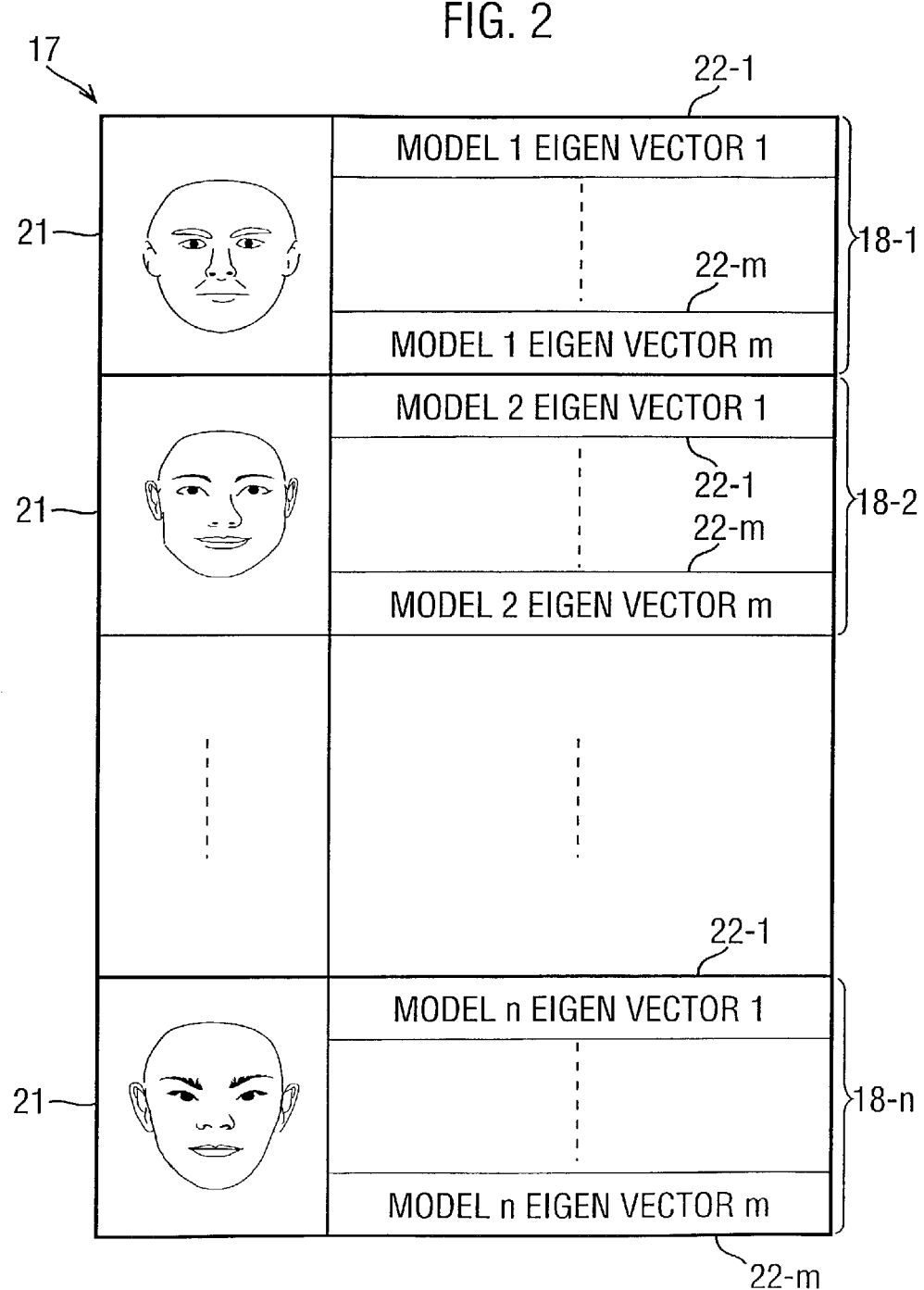
FIG. 2 is a schematic block diagram of model data within the model database of the model generation computer of FIG. 1.

FIG. 2 is a schematic block diagram of a face model 18-1; 18-n stored within the model database 17 of the model generation computer 3 of FIG. 1. In this embodiment, the model database 17 stores six face models comprising face models for white females, white males, black females, black males, oriental females and oriental males. Each of the models comprises an average face 21 and m eigenvectors 22-1-22-m, comprising vectors identifying the most significant ways in which faces of the gender and ethnicity of the model vary in terms of shape and appearance.

For each model, the average face is represented by data indicative of an average face of the type of individual being modelled in terms of an average colour image and, an average 3-D wire mesh model of the face of individuals sharing that type and a set of 2-D coordinates for fifty feature points on the average face image. The eigenvectors for a model in this embodiment comprise twenty five eigenvectors which identify the twenty-five most significant ways in which the location of the fifty feature points vary across individuals of the model type together with data identifying together with the manner in which the colour data for pixels at positions on the face located relative to the feature points vary in hue.

Figure 3:
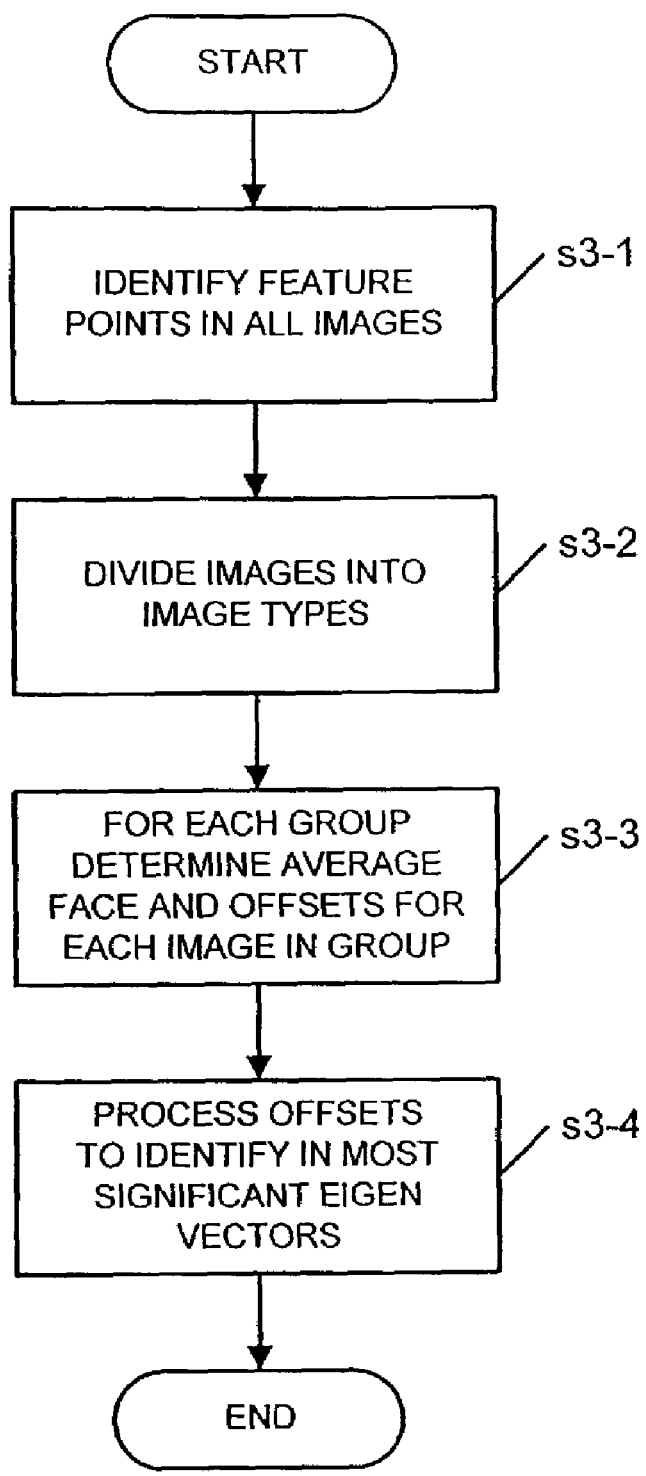
FIG. 3 is a flow diagram of the generation of model data of FIG. 2.

FIG. 3 is a flow diagram of the processing to generate the face model data 18-1; 18-n in the model database 17 of the model generation computer 3 of FIG. 1.

Initially, a library of data is obtained for a large number of individuals varying in sex and ethnicity. This database comprises for each individual an image of the face of the individual and a three-dimensional wire mesh model of the shape of the individual's face. Data for the three-dimensional wire mesh model may be obtained in any suitable way such as, for example, laser stripe scanning the individual's face.

Once a library of data of faces and corresponding 3-D models has been obtained, feature points in the images and wire mesh models are then identified (S3-1). These feature points in this embodiment comprise points outlining the edge of the shape of an individual's face, and points outlining the edge of an individual's eyes, eyebrows, lips and nose. Points running along the bridge of an individual's nose are also identified. In total, in this embodiment, fifty feature points are identified in each face image together with corresponding positions on the three-dimensional wire mesh model of those faces also being identified.

After the images and models have been marked up with the location of feature points being identified, each of the faces is then assigned a model type depending upon the gender and ethnicity of individuals appearing on images corresponding to the different face models which are to be generated. The marked up images and three-dimensional wire mesh models of faces assigned different types are then (S3-3) processed separately.

Specifically for all of the images and wire mesh models of each distinct gender/ethnicity combination, the average position of each of the marked up feature points is first determined. The difference of the position of feature points for individual faces in the group relative to this average position is then determined. Using conventional modelling techniques such as those described in "Active Appearance Models, Cootes et al., Proceedings European Conference on Computer Vision 1998, Volume 2, pp484-498, Springer, 1998", the average shape and appearance of faces associated with a particular gender/ethnicity combination is then determined by morphing the images of the faces sharing that gender/ethnicity combination so that the position of the feature points in the morphed images correspond to the average position of those features for the images in the group and then obtaining an average image from the morphed images. A vector representation of the manner in which each of the three-dimensional wire mesh models and images varies relative to an average wire mesh model and image for the group of images for that gender/ethnicity combination is then determined.

In this embodiment, each of these offset vectors comprises the offset of the three-dimensional coordinates of each of the feature points of the image relative to the corresponding average position for those feature points for the images in the group and colour data indicating the manner in which the colour of pixels on the morphed image for a particular face vary from corresponding pixels in the average face for that group.

Once an average wire mesh model for a particular group of faces for a particular gender/ethnicity combination and an accompanying colour image for the average face for that gender/ethnicity has been determined and offset vectors indicative of the manner in which individual faces in the group vary from that average face in terms of offsets of feature points and differences in colour data have been obtained, the offset vectors for the individual faces are then processed (S3-4) utilising conventional principle component analysis techniques to establish the correlations between the manner in which the shape offsets and colour offsets vary. The eigenvectors which are generated as a result of the principle component analysis processing are then ordered to establish which of the variations account for the majority of the variations between the different faces in the group. The top m vectors are then stored as part of the model for that type of face. In this embodiment twenty-five vectors are stored for each model.

By processing the available three-dimensional models and images of the faces of different ethnicities and genders separately, individual models for each classification are generated. By treating each group separately, a means is provided to ensure that the eigenvectors for each model represent variations that actually exist within each identifiable group. Thus, for example, the variation of colouring that arises due to the presence of facial hair will be modelled by the eigenvectors and associated with the male faces but will not be present in the models for female faces. In this way, by modelling the different categories of face independently of one another, storing data which models variations which do not actually occur is avoided and thereby the realistic modelling of individual faces can be achieved using fewer vectors.

The processing of image data and type data received from a mobile phone 1-1; 1-N via the communications network 5 by the model generation computer 3 will now be described in detail with reference to FIGS. 4 and 5.

Figure 4:
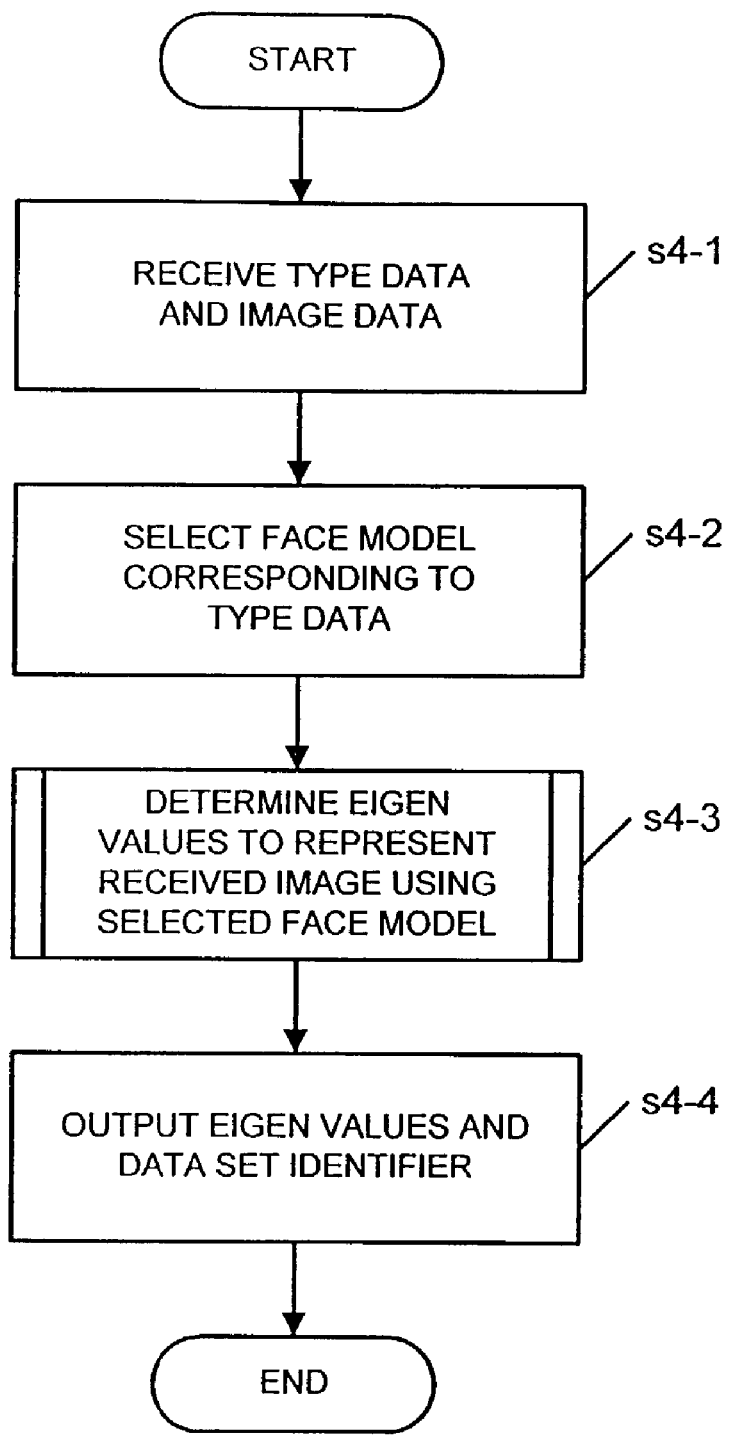
FIG. 4 is a flow diagram of the processing of the model generation computer of FIG. 1.
Figure 5:
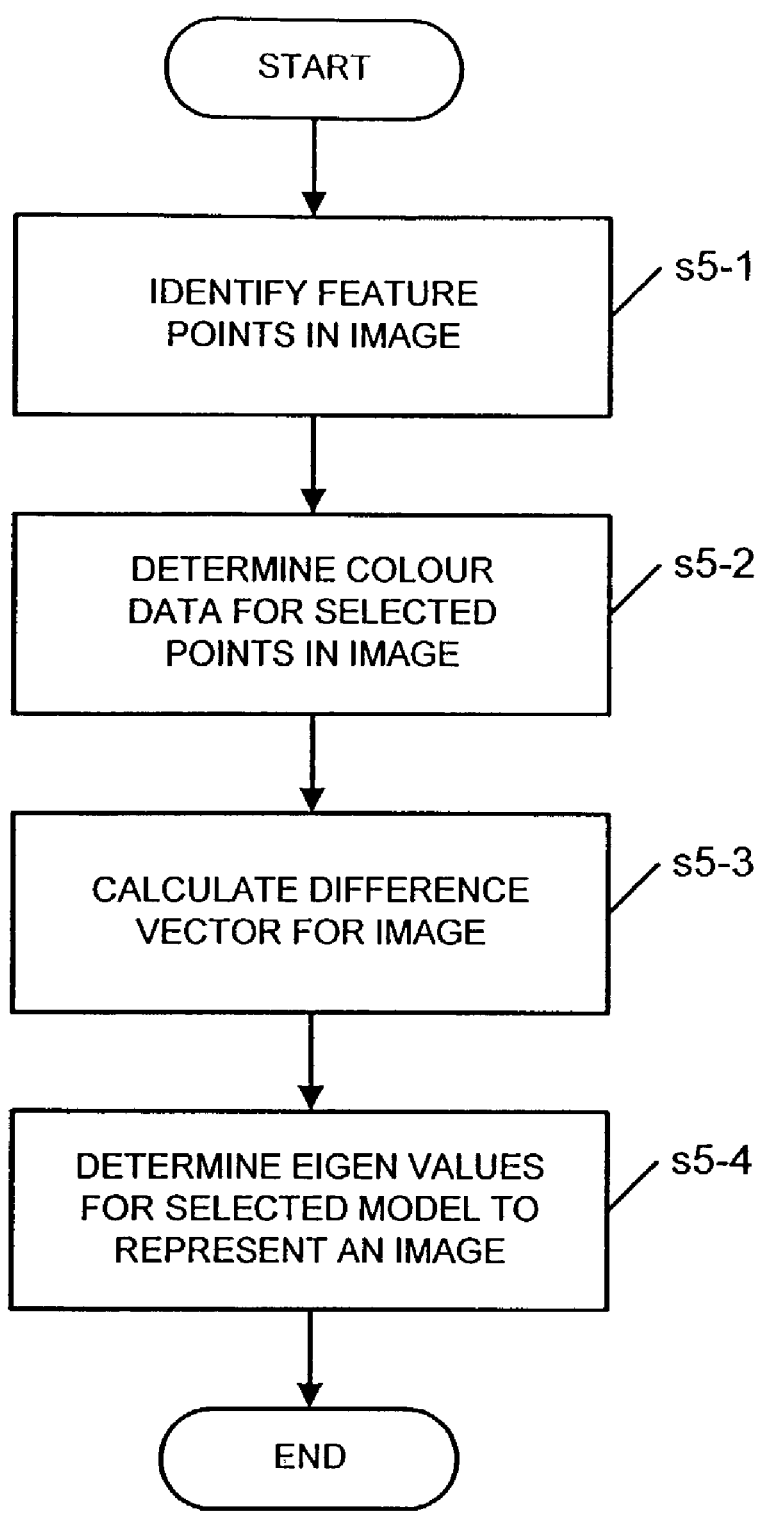
FIG. 5 is a flow diagram of the detailed processing of the model generation computer of FIG. 1 to generate a model of an individual face.

FIG. 4 is a flow diagram of the processing of image data and type data received by the model generation computer 3.

When image data and type data is initially received (S4-1) by the model generation computer 3, the type data identifying the ethnicity and gender of the individual appearing in the received image is passed to the selection unit 15.

The selection unit 15 then selects (S4-2) from the model database 17 a face model 18-1; 18-n that matches the received type data. Thus, for example, in the case of a white male, the face model 18-1; 18-n generated from images and wire mesh models of white males will be selected by the selection unit 15 from the model database 17.

Once a specific face model 18-1; 18-n has been selected, the matching unit 20 then proceeds to process the received image data using the selected face model 18-1; 18-n. The processing by the matching unit (S4-3) will now be described in detail with reference to FIG. 5 which is a flow diagram of the processing of the matching unit 20.

Initially, after a model has been selected using the type data, the matching unit 20 first processes (S5-1) the received image to identify feature points on the image. These feature points corresponding to the outlines of the face, eyes, eyebrows, noise and mouth and the brow of the nose which are the same as the feature points identified in images used to generate the face models 18-1-18-n in the model generation computer 3, are identified in the received image using conventional feature detection techniques.

The position of these feature points is then (S5-2) used to calculate a morphing function to distort the received image data so that the position of the feature points correspond to the average position for feature points as stored within the model 18-1; 18-n being used to process the perceived image. Colour data for the received image is then generated by determining colour pixel values for pixels in the morphed image and comparing those colour pixel values with corresponding colour pixel values in the average face image for that face type.

After the manner in which feature points in the received image differ in position from feature points in the average face for the face type being processed and colour data for pixels in the morphed image have been obtained, this data is combined in a vector (S5-3) and then the combination of eigenvectors 22 for the selected model which most closely models the determined vector is then calculated (S5-4) using conventional techniques to establish the relative weighting of eigenvectors which most closely models the received image.

Returning to FIG. 4, these calculated weighting values of eigenvalues are then output by the model generation computer 3 back to the mobile phone 1-1; 1-N from which the image and type data was originally received together with data identifying the face model 18-1; 18-n used to process the received image. These eigenvalues and a data set identifier identifying the face model 18-1; 18-n used to process the image together comprise sufficient data to enable an image of the caller using the mobile phone to be generated and appear on the screen 9 of a receiver's telephone as will now be described in detail with reference to FIGS. 6, 7 and 8.

Figure 6:
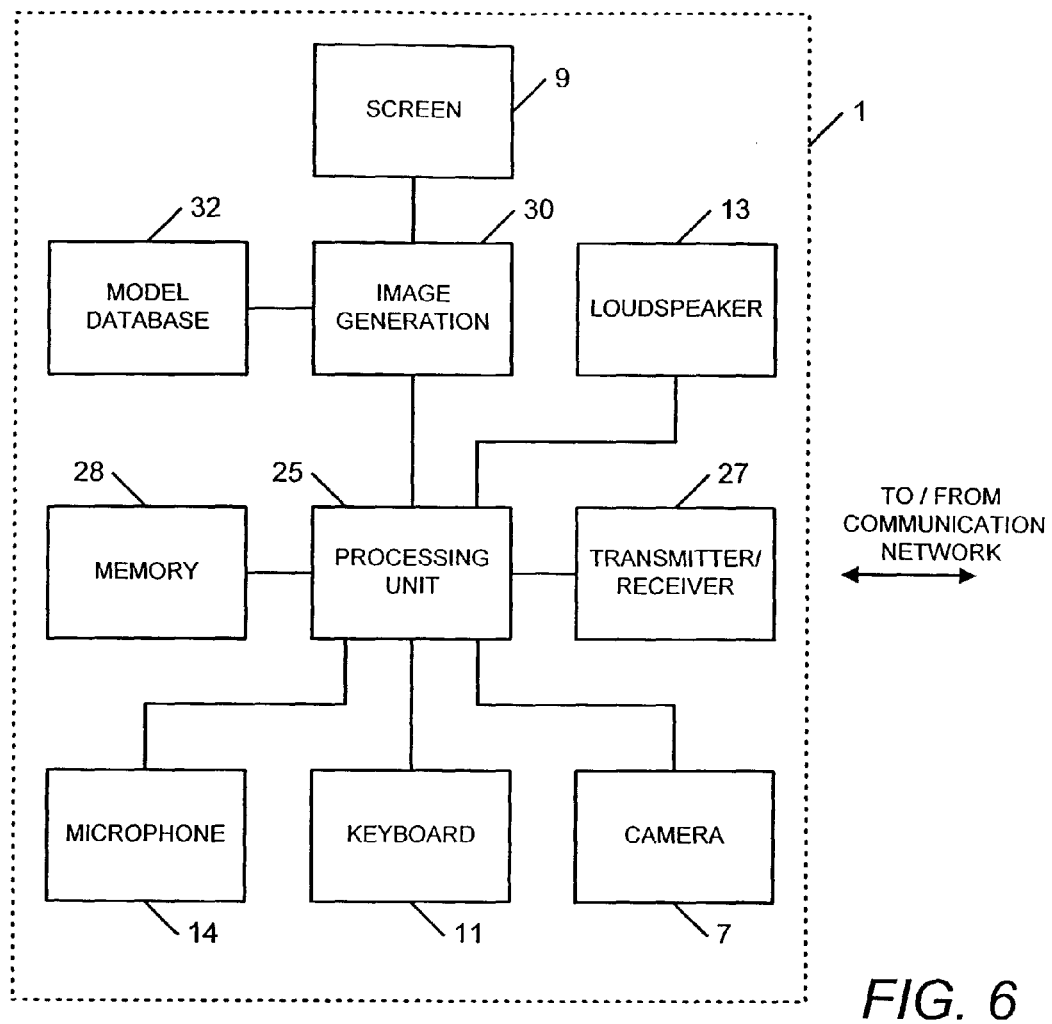
FIG. 6 is a schematic block diagram of a mobile phone of the communications network of FIG. 1.

FIG. 6 is a schematic block diagram of a mobile phone with a communication network of FIG. 1 in accordance with this embodiment of the present invention.

In this embodiment, each of the mobile phones 1-1-1-N comprises a processing unit 25 which is connected to the keyboard 11, the camera 7, the loudspeaker 13 and microphone 14 of the phone 1. In addition the processing unit 25 is also connected to a transmitter/receiver 27 and a memory 28 for storing weighting values for modelling images of individuals. The processing unit 25 is also connected to the screen 9 of the phone 1 via an image generation module 30. The image generation module 30 is itself connected to a model database 32. Together the image generation module 30 and model database 32 interact to enable model images of individuals to be generated utilising weighting data and data identifying a model type received by the phone 1 via the transmitter/receiver 27.

Figure 7:
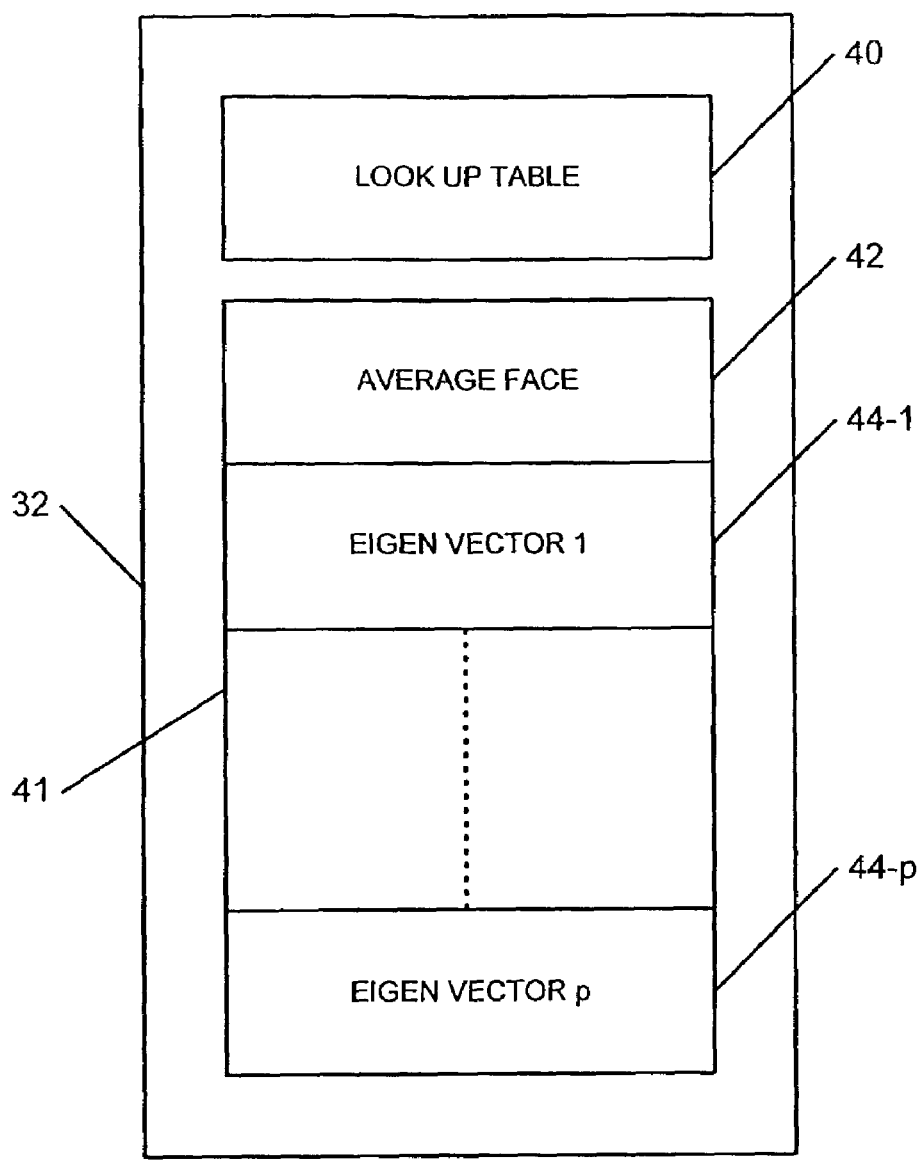
FIG. 7 is a schematic block diagram of the model database of the mobile phone of FIG. 6.

FIG. 7 is a schematic block diagram of the model database 32 of FIG. 6, which illustrates in greater detail data stored within the model database 32.

In this embodiment the model database 32 is arranged to store a lookup table 40 and a principle component analysis model for modelling faces 41 of any gender or ethnicity. The principle component analysis model 41 itself comprises average face data 42 and a number of eigenvectors 44-1-44-$p$ for modelling the variations between individuals faces. The average face data 42 and eigenvectors 44-1-44-$p$ in this embodiment comprise a principle component analysis model generated utilising the entire available library of faces used to generate the different face models 18-1-18-$n$ stored within the model generation computer 3.

In this embodiment, the lookup table 40 comprises data associating each eigenvector 22 of each of the face models 18-1-18-$n$ with a set of p weights (one for each of the eigenvectors 44-1-44-$p$ of the model stored within the model database 32). These weights comprise data identifying the relative weights necessary to enable the eigenvectors 44-1-44-$p$ of the model stored on the phone 1 to model the variations identified by the eigenvectors 22 of the individual models stored within the model database 17 of the model generation computer 3.

Figure 8:
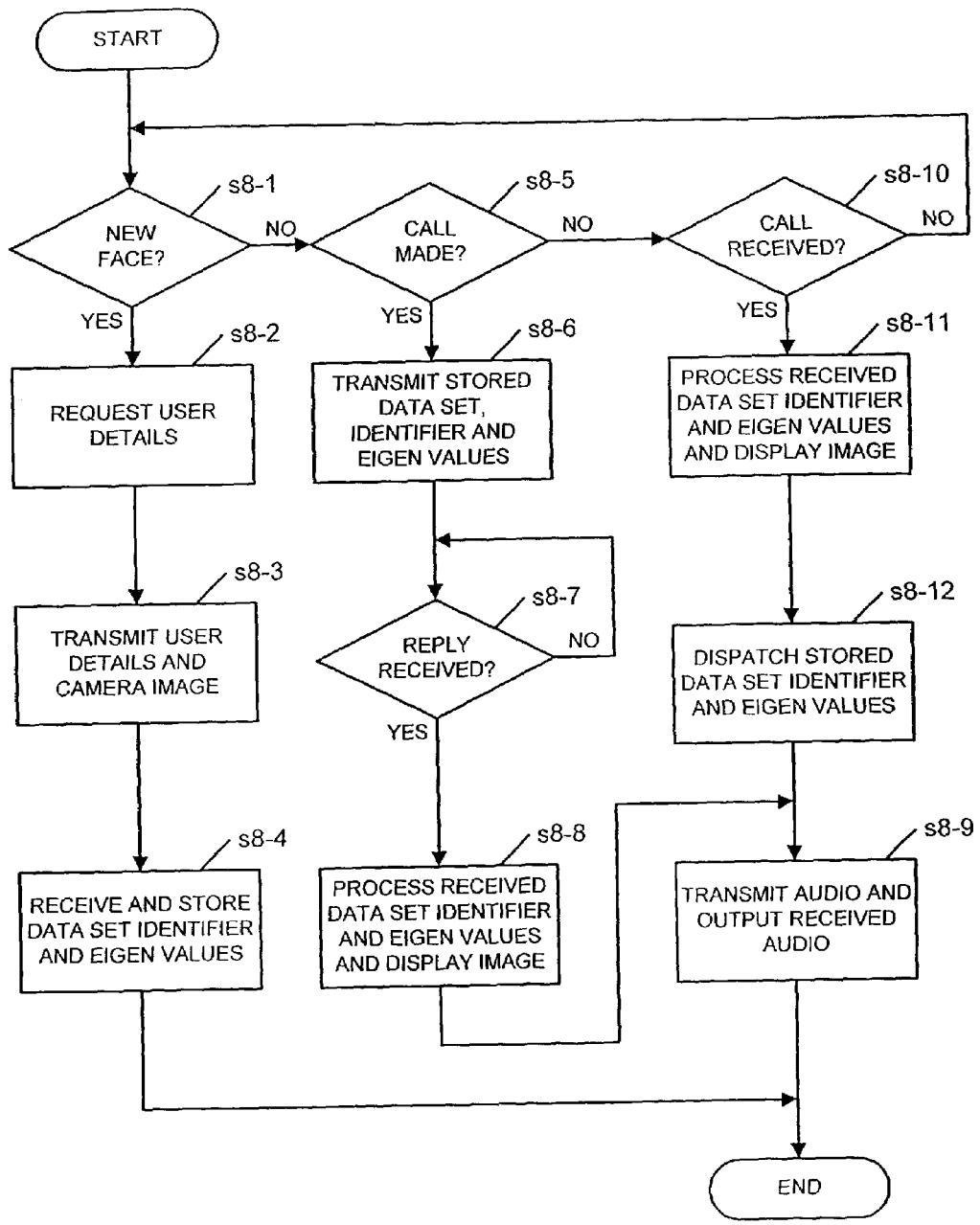
FIG. 8 is a flow diagram of the processing of data by the mobile phone of FIG. 6.

The processing of data by the processing unit 25 and image generation module 30 of a mobile phone in accordance with this embodiment of the present invention will now be described in detail with reference to FIG. 8.

The processing unit 25 initially (s8-1) determines whether any data has been input via the keyboard 11 indicating that the user of the phone 1 wishes to generate a new face model for storage within the memory 28 of the phone 1.

If this is the case, the processing unit 25 then (s8-2) causes a prompt to appear on the screen 9 of the phone 1 requesting the user input data identifying their gender and ethnic type as well as requesting the user to take a photograph of themselves using the camera 7 of the phone 1.

When data has been entered and an image obtained using the camera 7 the data and image is then (s8-3) transmitted via the transmitter/receiver 27 and the communications network 5 to the model generation computer 3 where it is then processed. As a result of the processing of the image data and data identifying gender and ethnicity by model generation computer 3, the model generation computer 3 outputs a set of weighting values and a data set identifier identifying the face model 18-1; 18-$n$ used to generate the model. The model data and data set identifier are then transmitted back via the communication network 5 to the phone 1. When these weighting values and the data set identifier are received (s8-4) they are passed by the processing unit 25 to the memory 28 where they are stored.

If the processing unit 26 determines (s8-1) that a request for storing a new set of face modelling data has not been entered, the processing unit 25 then (s8-5) determines whether a telephone number has been entered using the keyboard 11. If this is the case, the mobile phone then connects to the phone identified by the telephone number via the communications network 5 in a conventional manner. The mobile phone 1 then transmits (s8-6) via the communication network 5 the data set identifier identifying a face model 18-1-18-$n$ and weighting values currently stored in the memory 28.

The processing unit 25 then waits (s8-7) until a reply is received from the telephone being called via the communication network 5 and the transmitter/receiver 27. When a reply is received the reply will include a data set identifier and a set of weighting values. The processing unit 25 then passes the data set identifier the weighting values to the image generation module 30 which then processes them using the data stored within the model database 32 to generate an image of the receiver of the call which is displayed on the screen 9.

Specifically weights for modelling the image of the person being called are determined by multiplying each of the items of weight data stored within the lookup table 40 for the vectors associated with the model type identified by received type data by the weighting values received with the type data and then summing the results to obtain values for multiplying eigenvectors.

Thus for example, if the following data was received

Model type: White female

Weights $W(1)$
$W(2)$
$\vdots$
$W(n)$

And the following weight data was stored

White female (1): $wf_1(1) \ldots wf_1(p)$
White female (2): $wf_2(1) \ldots wf_2(p)$
$\vdots$
White female (n): $wf_n(1) \ldots wf_n(p)$ The following p values would be obtained $e(1) = w(1) \times wf_1(1) + \ldots w(n) \times wf_n(1)$
$e(2) = w(1) \times wf_1(2) + \ldots w(n) \times wf_n(2)$
$\vdots$
$e(p) = w(1) \times wf_1(p) + \ldots w(n) \times wf_n(p)$ to achieve a final set of p values, one for each of the p eigenvectors 44-1-44-$p$ used to model faces on the phone 1.

An image is then generated by altering the average face 42 of the model 41 stored within the model database 32 altered by the p eigenvectors 44-1-44-$p$ weighted by these calculated eigenvalues. The calculated image is then displayed on the screen 9 of the phone 1.

Once an image of a caller has been calculated and displayed on the screen 9 of the phone 1, the phone 1 then proceeds to transmit audio data received via the microphone 14 and output received audio data received via the transmitter/receiver 27 out through the loudspeaker 13 in a conventional manner.

If the processing unit determines (s8-5) that no call has been made using the keyboard 11, the processing unit 25 then determines whether data indicating a call has been received has been received by the transmitter/receiver 27. If this is not the case the processing unit 25 then once again checks (s8-1) whether data indicating that a new face is to be stored within the memory 28 being input via the keyboard 11.

If the processing unit determines (s8-10) that a call has been received via the transmitter/receiver 27, the data received will include weighting values and a data set identifier. The processing unit 25 then (s8-11) processes received weighting values and data set identifier received via the communication network 5 and the transmitter/receiver 27 by passing this data to the image generation module 30 which generates an image of the caller in the same way as previously being described in relation to generating the image of an individual being called (s8-8).

Once an image of the individual calling has been calculated and displayed on the screen 9, the processing unit 25 (s8-12) then causes the weighting values and data set identifier stored within the memory 28 of the phone 1 to be dispatched via the transmitter/receiver 27 and the communications network 5 to the phone 1 from which a call has been received. The processing unit 25 then causes audio data received by the microphone 14 to be transmitted via the transmitter/receiver 27 and an audio data received by the transmitter/receiver 27 to be output by the loudspeaker 13 in a conventional manner (s8-9).

Second Embodiment

Figure 9:
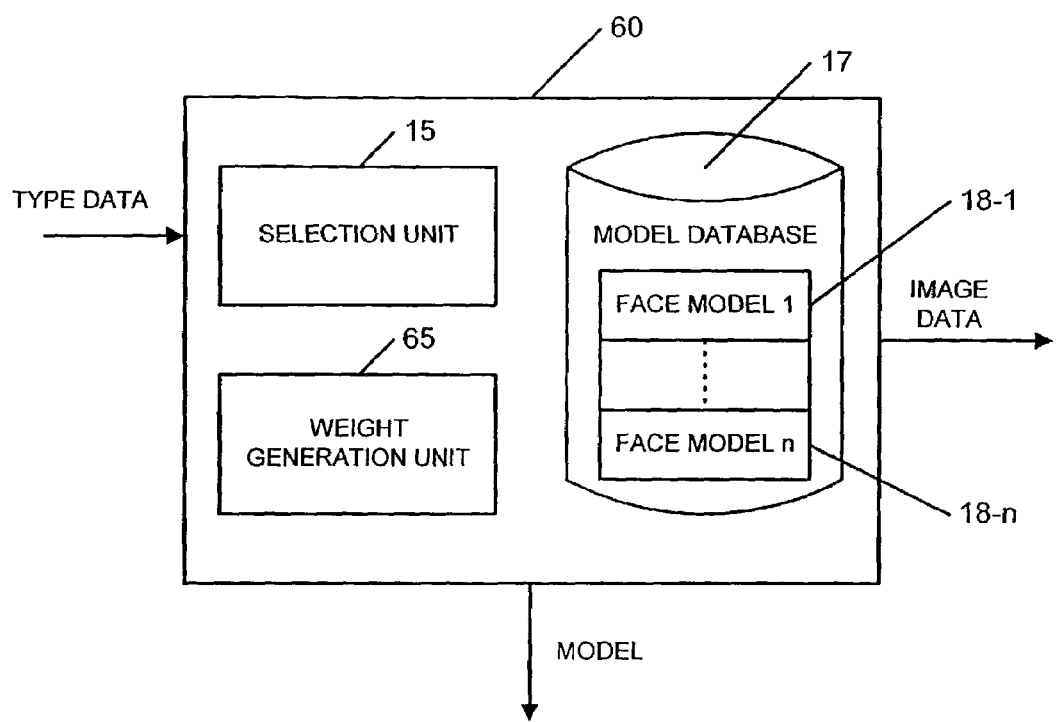
FIG. 9 is a schematic block diagram of a second embodiment of the present invention.

A second embodiment of the present invention will now be described. FIG. 9 is a schematic block diagram of a model generation unit 60 in accordance with a second embodiment of the present invention. The model generation unit 60 is identical to the model generation computer 3 of the first embodiment except the matching unit 20 is replaced by a weight generation unit 65. The model generation unit 60 in this embodiment is utilised to generate random models of faces of individuals having a specific known gender and ethnicity.

In use the model generation unit 60 receives data identifying the gender and ethnicity of a face which is to be generated. This data is then passed to the selection unit 15. The selection unit then selects from the model database 17 a face model 18-1-18-n which is to be utilised to generate a model face. The selected model is then used by the model generation unit 60 to generate a model face of an individual of the gender and ethnicity of the type identified by the type data. This is achieved by the weight generation unit 65 randomly assigning a set of weights to the eigenvectors of the selected model. The eigenvectors are then summed weighted by the sets of the weights associated generated by the weight generation unit 65 and an average face for the selected model is modified utilising these summed vectors. The result is then output as a model of a random individual of the gender and ethnicity indicated by the type data.

By providing a database of models of different individuals of different genders and ethnic types in the manner previously described in relation to FIG. 3 a means is provided by which receipt of type data can be utilised to generate a random face of an individual having that gender/ethnicity combination. The models generated by the model generation unit 60 may be utilised in for example the computer game.

Further Embodiments and Modifications

Although in the embodiments models have been described generated for individual of different genders and ethnic types, it will be appreciated that other factors could be used to separate individuals into different groups. Thus for example models could be generated for individuals of different age ranges or by the presence in images of distinguishing features for example beards or glasses etc.

It will be appreciated that although in the first embodiment the weighting values obtained for modelling an image using a model associated with a specific type then converted to weights for a modelling system for modelling any facial type, in an alternative embodiment, a set of models could be stored on a phone and the weighting values could be used directly to generate an image of a caller.

Although in the above described embodiments, the number of eigenvectors used to model variations within groups of individuals is described as being the same, it will be appreciated that variation in different groups could be modelled using different numbers of vectors.

Although in the first embodiment data identifying user characteristics such as gender and ethnicity are described as being entered using a keyboard 11 other methods could be utilised. Thus for example, the average faces 21 for different groups could be displayed on the screen 9 of a phone 1 and a user prompted to select the face most closely corresponding to their own face before sending out data for generating a model. Alternatively, type data for a user could be pre-stored in for example the SIM card for a phone 1 with data being obtained from a user when the phone is initially purchased. A further alternative would be for the model generation computer 3 to store a database of users and to select and appropriate face model 18-1 based upon the identification of a phone 1 contacting the model generation computer 3.

In further embodiments, any entry of data indicating for example gender or ethnicity might be avoided. This could be achieved by the model generation computer 3 processing a received image to identify the gender or ethnicity etc of an individual pictured. Such a system would also have the advantage that the most appropriate classification would be most likely to be used.

It will be appreciated that although in the above embodiments three dimensional colour models of faces are described, the present invention is equally applicable to grey scale images and two dimensional models.

Although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source or object code or in any other form suitable for use in the implementation of the processes according to the invention. The carrier be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means.

When a program is embodied in a signal which may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

Although in the above embodiments, systems for modelling faces have been described, it will be appreciated that the present invention is more generally applicable. Specifically, the present invention may be utilised to model for example whole heads rather than only faces or alternatively larger portions of an individual (e.g. head and shoulders) or even for generating full body models.

The invention claimed is:

1. A method of communicating data for generating an image of an individual at a destination communication terminal, the method comprising:
   generating a plurality of face models utilizing images of individuals, each of the face models being built using images of individuals who share at least one identifying characteristic related to gender, ethnicity, age, or the presence or absence of facial hair or glasses;
   receiving type data identifying an identifying characteristic related to gender, ethnicity, age, the presence or absence of facial hair, or the presence or absence of glasses of a target individual in an image;
   selecting from among the generated face models, a face model built by using images of individuals who share the identifying characteristic corresponding to the received type data;
   modifying the image including the target individual such that positions of feature points in the image including the target individual correspond to positions of feature points identified by the selected face model;
   generating a model of the target individual in the image based on a comparison of color data in the modified image with an average face image generated using the selected face model; and
   sending the generated model of the target individual and data identifying the selected face model to a destination communication terminal operable to generate an image of the target individual using the generated model and the data identifying the selected face model.

2. A method in accordance with claim 1, wherein said at least one identifying characteristic comprises the gender of an individual.

3. A method in accordance with claim 1, wherein said at least one identifying characteristic comprises the ethnicity of an individual.

4. A method in accordance with claim 1, wherein said at least one identifying characteristic comprises the age of an individual.

5. A method in accordance with claim 1, wherein said at least one identifying characteristic comprises the presence or absence of facial hair.

6. A method in accordance with claim 1, wherein said at least one identifying characteristic comprises the presence or absence of glasses.

7. A method in accordance with claim 1 further comprising:
   generating an image of said target individual at the destination communication terminal using the generated model and the data identifying the selected face model.

8. Data processing apparatus for generating models of individuals, said apparatus comprising:
   a database storing a plurality of face models generated utilizing images of individuals, each of the face models being built using images of individuals who share at least one identifying characteristic related to gender, ethnicity, age, or the presence or absence of facial hair or glasses;
   a receiver operable to receive type data identifying an identifying characteristic related to gender, ethnicity, age, the presence or absence of facial hair, or the presence or absence of glasses of a target individual in an image;
   a selector responsive to receipt of the type data by said receiver to select a face model from among the face models stored in said database built using images of individuals sharing the identifying characteristic identified by the received type data;
   a processing unit operable to generate a model of a target individual by:
   modifying an image including the target individual such that positions of feature points in the image including the target individual correspond to positions of feature points identified by the face model selected by said selector, and
   comparing color data in the modified image with an average face image generator using the selected face mode; and
   a transmitter operable to transmit a model of a target individual generated by said processing unit together with data identifying the selected face model utilized to generate the model of a target individual to a destination communication terminal operable to generate an image of the target individual using the generated model and the data identifying the selected face model.

9. An apparatus in accordance with claim 8, wherein at least one of said face models stored in said database comprises a face model generated utilising images only of individuals of the same gender.

10. An apparatus in accordance with claim 8, wherein at least one of said face models stored in said database comprises a face model generated utilising images only of individuals sharing the same ethnic type.

11. An apparatus in accordance with claim 8, wherein at least one of said face models stored in said database comprises a face model generated utilising images only of individuals with ages falling within the same age range.

12. An apparatus in accordance with claim 8, wherein at least one of said face models stored in said database comprises a face model generated utilising images only of individuals with facial hair or only individuals without facial hair.

13. An apparatus in accordance with claim 8, wherein at least one of said face models stored in said database comprises a face model generated utilising images only of individuals wearing glasses or only individuals not wearing glasses.

14. An apparatus in accordance with claim 8 wherein said data processing apparatus is responsive to receipt of a model of an individual and data identifying a face model stored in the database to generate an image of an individual utilizing the received model and the identified stored face model.

15. A computer readable medium storing computer implementable instructions which, when interpreted by a programmable computer, cause the computer to:
   store a plurality of face models generated utilizing images of individuals, each of the face models being built using images of individuals who share at least one identifying characteristic related to gender, ethnicity, age or the presence or absence of facial hair or glasses; and
   respond to receipt of type data identifying an identifying characteristic related to gender, ethnicity, age, the presence or absence of facial hair, or the presence or absence of glasses of a target individual in an image by:

selecting from among the stored face models, a face model built by using images of individuals who share the identifying characteristic corresponding to the received type data;

modifying the image including the target individual such that positions of feature points in the image including the target individual correspond to positions of feature points identified by the selected face model; and generating a model of the target individual in the image based on a comparison of color data in the modified image with an average face image generated using the selected face model; and send the generated model and data identifying the selected face model to a destination communication terminal which is operable to generate a model image of the target individual using the generated model and data identifying the selected face model.

16. A computer readable medium in accordance with claim 15, wherein said at least one identifying characteristic comprises the gender of an individual.

17. A computer readable medium in accordance with claim 15, wherein said at least one identifying characteristic comprises the ethnicity of an individual.

18. A computer readable medium in accordance with claim 15, wherein said at least one identifying characteristic comprises the age of an individual.

19. A computer readable medium in accordance with claim 15, wherein said at least one identifying characteristic comprises the presence or absence of facial hair.

20. A computer readable medium in accordance with claim 15, wherein said at least one identifying characteristic comprises the presence or absence of glasses.

21. A computer readable medium in accordance with claim 15 further storing computer implementable instructions which when interpreted by a programmable computer cause the computer to:

respond to receipt of a model of an individual and data identifying a stored face model by generating an image of an individual utilizing the received model and the identified stored face model.

* * * * *

UNITED STATES PATENT AND TRADEMARK OFFICE
CERTIFICATE OF CORRECTION

PATENT NO.         : 7,257,239 B2
APPLICATION NO. : 10/241594
DATED              : August 14, 2007
INVENTOR(S)        : Rowe et al.

It is certified that error appears in the above-identified patent and that said Letters Patent is hereby corrected as shown below:

| | | |
|---|---|---|
| Col. 1, | line 8, | "relates" should read --relate--. |
| Col. 10, | line 38 | "etc" should read --etc.--. |
| Col. 11, | line 57, | "claim 1" should read --claim 1,--. |
| Col. 12, | line 33, | "utilising" should read --utilizing--. |
| | line 37, | "utilising" should read --utilizing--. |
| | line 41, | "utilising" should read --utilizing--. |
| | line 45, | "utilising" should read --utilizing--. |
| | line 50, | "utilising" should read --utilizing--. |
| | line 53, | "claim 8" should read --claim 8,--. |

Signed and Sealed this

First Day of July, 2008

JON W. DUDAS
*Director of the United States Patent and Trademark Office*